(12) United States Patent
Zhang et al.

(10) Patent No.: US 10,840,802 B2
(45) Date of Patent: Nov. 17, 2020

(54) ISOLATED SWITCHED CAPACITOR CONVERTER

(71) Applicant: Silergy Semiconductor Technology (Hangzhou) LTD, Hangzhou (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 15/980,890

(22) Filed: May 16, 2018

(65) Prior Publication Data

US 2018/0337594 A1    Nov. 22, 2018

(30) Foreign Application Priority Data

May 22, 2017    (CN) .......................... 2017 1 0364680

(51) Int. Cl.
*H02M 3/07* (2006.01)
*H02M 1/08* (2006.01)

(52) U.S. Cl.
CPC ............... *H02M 3/07* (2013.01); *H02M 1/08* (2013.01)

(58) Field of Classification Search
CPC .................................. H02M 3/07; H02M 1/08
See application file for complete search history.

(56) References Cited

U.S. PATENT DOCUMENTS

| | | | |
|---|---|---|---|
| 8,687,382 B2 | 4/2014 | Chen | |
| 9,295,116 B2 | 3/2016 | Sanders et al. | |
| 9,473,034 B2 | 10/2016 | Huang et al. | |
| 9,627,972 B2 | 4/2017 | Mao et al. | |
| 9,762,128 B2 | 9/2017 | Zhang et al. | |
| 9,787,291 B1* | 10/2017 | Reindl | H03H 19/004 |
| 2008/0144241 A1* | 6/2008 | Crawley | H02H 3/023 361/56 |
| 2009/0278520 A1* | 11/2009 | Perreault | H02M 3/07 323/282 |
| 2011/0260539 A1* | 10/2011 | Wai | H02J 7/34 307/66 |
| 2012/0112724 A1* | 5/2012 | Nishida | H02M 3/07 323/293 |
| 2012/0249239 A1* | 10/2012 | Garrity | H03G 1/0094 330/129 |
| 2013/0063120 A1* | 3/2013 | Hoellinger | H02M 3/07 323/311 |

(Continued)

*Primary Examiner* — Thienvu V Tran
*Assistant Examiner* — Bart Iliya
(74) *Attorney, Agent, or Firm* — Michael C. Stephens, Jr.

(57) ABSTRACT

An isolated switched capacitor converter can include: first switches coupled in series between terminals of an input port, and being configured to selectively connect a first terminal of a first capacitor to a first or second terminal of the input port; second switches coupled in series between terminals of an output port, and being configured to selectively connect a second terminal of the first capacitor to a first or second terminal of the output port; third switches coupled in series between terminals of the input port, and being configured to selectively connect a first terminal of a second capacitor to the first or second terminal of the input port; and fourth switches coupled in series between terminals of the output port, and being configured to selectively connect a second terminal of the second capacitor to the first or second terminal of the output port.

20 Claims, 11 Drawing Sheets

(56) References Cited

U.S. PATENT DOCUMENTS

| | | | | |
|---|---|---|---|---|
| 2015/0035380 A1* | 2/2015 | Posat | ............... | H02J 50/80 |
| | | | | 307/104 |
| 2015/0123829 A1* | 5/2015 | Kim | ............... | H03M 3/496 |
| | | | | 341/143 |
| 2015/0357912 A1* | 12/2015 | Perreault | ............ | H02M 1/4208 |
| | | | | 363/126 |
| 2018/0198367 A1 | 7/2018 | Zhang et al. | | |
| 2019/0157972 A1* | 5/2019 | Giuliano | ............... | H02M 3/07 |

* cited by examiner

US 10,840,802 B2

ISOLATED SWITCHED CAPACITOR CONVERTER

RELATED APPLICATIONS

This application claims the benefit of Chinese Patent Application No. 201710364680.9, filed on May 22, 2017, which is incorporated herein by reference in its entirety.

FIELD OF THE INVENTION

The present invention generally relates to the field of power electronics, and more particularly to isolated switched capacitor converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
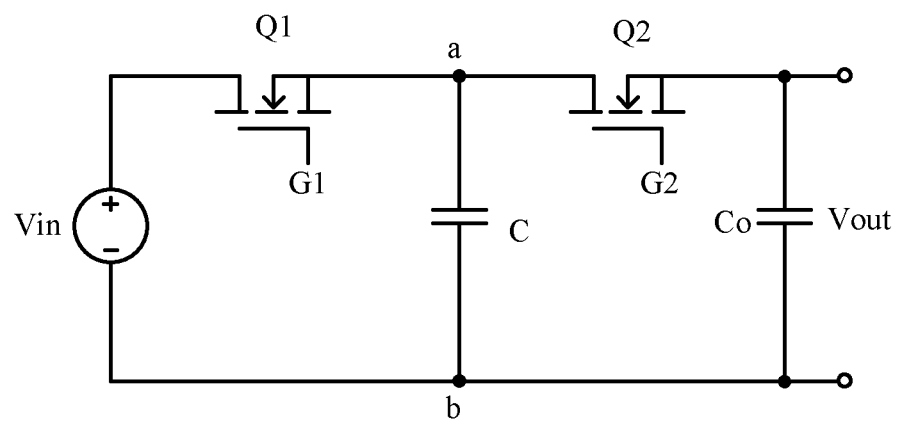
FIG. 1 is a schematic block diagram of an example switched capacitor converter.
Figure 2:
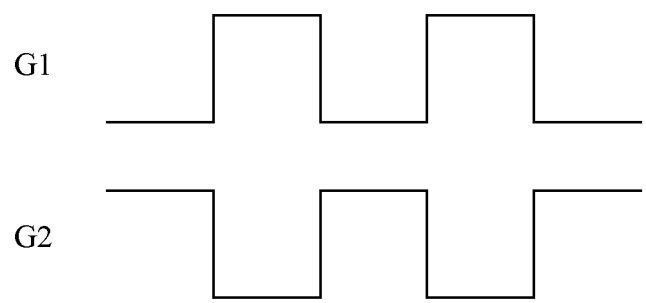
FIG. 2 is a waveform diagram of example operation of the switched capacitor converter of FIG. 1.

Referring now to FIG. 1, shown is a schematic block diagram of an example switched capacitor converter. Referring also to FIG. 2, shown is a waveform diagram of example operation of the switched capacitor converter of FIG. 1. A switched capacitor converter may realize voltage or current conversion by controlling the charge and discharge of capacitors through switches. Here, an input port can receive input voltage Vin. Switch Q1 can connect between terminal "a" of capacitor C and a first terminal of a voltage input port, and may be turned on and off under the control of control signal G1. Switch Q2 can connect between terminal "a" of capacitor C and a first terminal of an output port, and can be turned on and off under the control of control signal G2. Also control signals G1 and G2 may be complementary, such that when control signal G1 is high, control signal G2 is low, and vice versa.

Terminal "b" of capacitor C can connect to a second terminal of the input port and a second terminal of the output port. The second terminal of the input port and the second terminal of the output port may be a reference terminal (e.g., a ground terminal). Output capacitor Co can also be configured in the output port to smooth output voltage Vout. Thus, capacitor C May intermittently discharge to the output port by alternately turning switches Q1 and Q2 on and off, thereby realizing power transmission and voltage/current conversion. However, in this structure, the input port and the output port share a common ground, and capacitor C intermittently outputs an output current to the output port, which can lead to larger undesirable current pulsation on an input source and the output capacitor. Further, this example isolated converter may utilize coils with a larger volume that is not conducive to a miniaturized system.

In one embodiment, an isolated switched capacitor converter can include: (i) a first capacitor; (ii) a first set of switches coupled in series between two terminals of an input port, and being configured to selectively connect a first terminal of the first capacitor to a first or second terminal of the input port; (iii) a second set of switches coupled in series between two terminals of an output port, and being configured to selectively connect a second terminal of the first capacitor to a first or second terminal of the output port; (iv) a second capacitor; (v) a third set of switches coupled in series between two terminals of the input port, and being configured to selectively connect a first terminal of the second capacitor to the first or second terminal of the input port; and (vi) a fourth set of switches coupled in series between two terminals of the output port, and being configured to selectively connect a second terminal of the second capacitor to the first or second terminal of the output port, wherein at least portions of the first, second, third, and fourth sets of switches are controlled to perform state switching such that a voltage conversion ratio of the isolated switched capacitor converter is adjustable.

Figure 3:
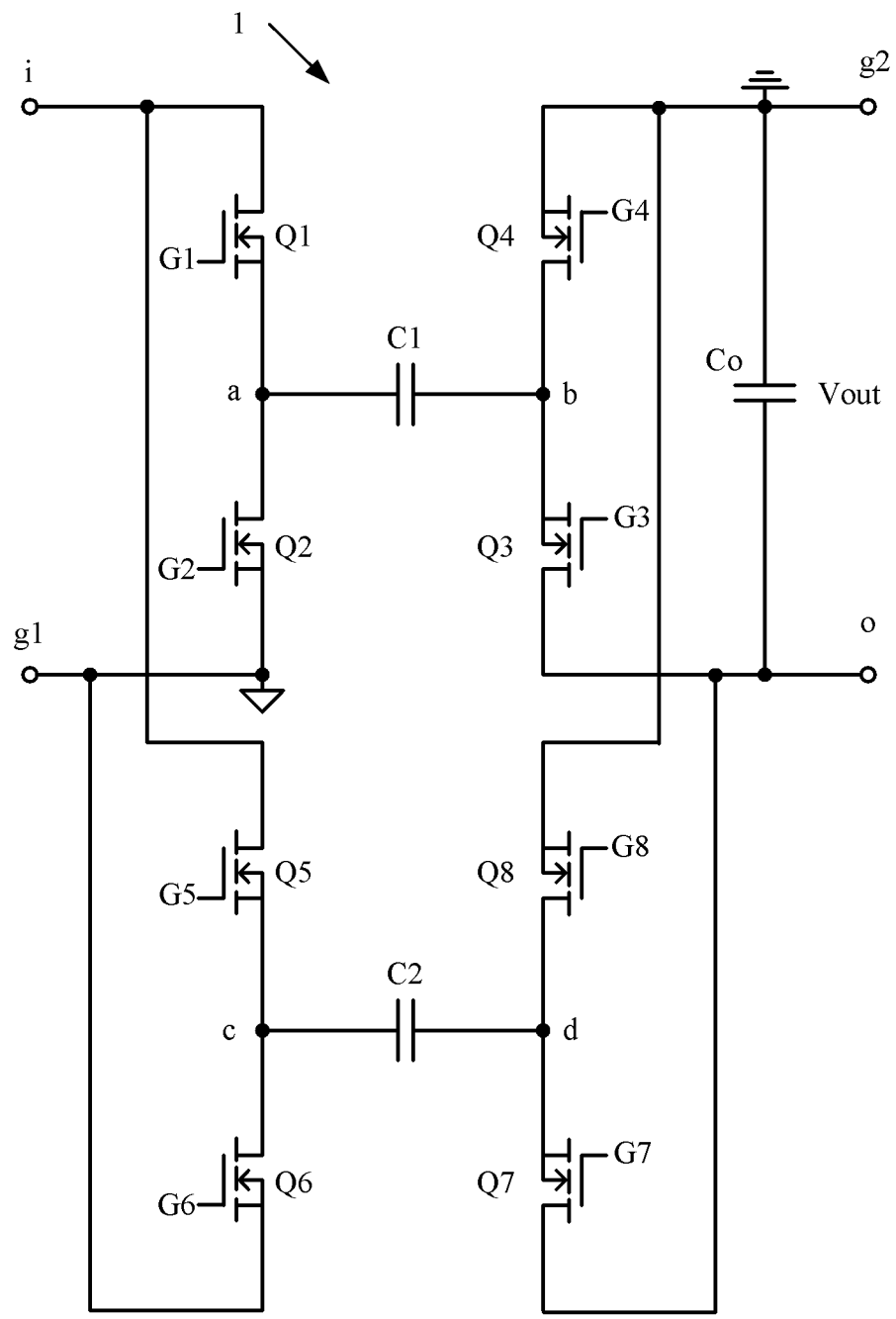
FIG. 3 is a schematic block diagram of an example isolated switched capacitor converter, in accordance with embodiments of the present invention.

Referring now to FIG. 3, shown is a schematic block diagram of an example isolated switched capacitor converter, in accordance with embodiments of the present invention. In this particular example, isolated switched capacitor converter 1 can include capacitor C1, capacitor C2, first set of switches Q1 and Q2, second set of switches Q3 and Q4, third set of switches Q5 and Q6, and fourth set of switches Q7 and Q8. The first set of switches Q1 and Q2 can connect in series between two terminals of an input port (e.g., terminals "i" and "g1"). For example, terminal "g1" of the input port is a reference terminal or a ground terminal of the input port. The common terminal of switches Q1 and Q2 can connect to terminal "a" of capacitor C1.

The first set of switches Q1 and Q2 can selectively connect terminal "a" of capacitor C1 to terminal "i" or terminal "g1" of the input port under the control of control signals G1 and G2. Also, switch Q1 can connect between terminal "i" of the input port and terminal "a" of capacitor C1. Switch Q2 can connect between terminal "g1" of the input port and terminal "a" of capacitor C1. Switches Q1 and Q2 may be controlled to be alternately turned on and off, thereby connecting terminal "a" of capacitor C1 to terminal "i" or terminal "g1" of the input port.

The second set of switches Q3 and Q4 can connect in series between two terminals of an output port (e.g., terminals "o" and "g2"). In this particular example, terminal "g2" of the output port is as a reference terminal or a ground terminal of the output port. The common terminal of switches Q3 and Q4 can connect to terminal "b" of capacitor C1. The second set of switches Q3 and Q4 may selectively connect terminal "b" of capacitor C1 to terminal "o" or terminal "g2" of the output port under the control of control signals G3 and G4. Also, switch Q3 can connect between terminal "o" of the output port and terminal "b" of capacitor C1. Switch Q4 can connect between terminal "g2" of the output port and terminal "b" of capacitor C1. Switches Q3 and Q4 may be controlled to be alternately turned on and off, thereby connecting terminal "b" of capacitor C1 to terminal "o" or terminal "g2" of the output port.

The third set of switches Q5 and Q6 can connect in series between two terminals of the input port. The common terminal of switches Q5 and Q6 can connect to terminal "c" of capacitor C2. The third set of switches Q5 and Q6 may selectively connect terminal "c" of capacitor C2 to terminal "i" or terminal "g1" of the input port under the control of control signals G5 and G6. Also, switch Q5 can connect between terminal "i" of the input port and terminal "c" of capacitor C2. Switch Q6 can connect between terminal "g1" of the input port and terminal "c" of capacitor C2. Switches Q5 and Q6 may be controlled to be alternately turned on and off, thereby connecting terminal "c" of capacitor C2 to terminal "i" or terminal "g1" of the input port.

The fourth set of switches Q7 and Q8 can connect in series between two terminals of the output port. The common terminal of switches Q7 and Q8 can connect to terminal "d" of capacitor C2. The fourth set of switches Q7 and Q8 can selectively connect terminal "d" of the capacitor C2 to terminal "o" or terminal "g2" of the output port under the control of control signals G7 and G8. Also, switch Q7 can connect between terminal "o" of the output port and terminal "d" of capacitor C2. Switch Q8 can connect between terminal "g2" of the output port and terminal "d" of capacitor C2. Switches Q7 and Q8 may be controlled to be alternately turned on and off, thereby connecting terminal "d" of capacitor C2 to terminal "o" or terminal "g2" of the output port.

When the switches change the connection relationship between the terminals of the capacitor and the input port or the output port by changing states, this can be referred to as the corresponding switch set performing state switching. The control signals that respectively control corresponding switches in a switch set may be referred to as a set of control signals. In this example, switches Q1-Q8 can be implemented by any suitable electrical controlled switching devices, such as metal oxide semiconductor field effect transistors (MOSFET), bipolar junction transistors (BJT), or insulated gate bipolar transistors (IGBT). Though each set of switches includes two switches in the example of FIG. 3, more switches can alternatively be configured therein in particular embodiments.

In FIG. 3, the first set of switches Q1 and Q2, the second set of switches Q3 and Q4, and capacitor C1 may form an H-bridge. The third set of switches Q5 and Q6, the fourth set of switches Q7 and Q8, and capacitor C2 may form another H-bridge. In this example, the two H-bridges are parallel and share the input port and the output port. At least portions of the first set of switches Q1 and Q2, the second set of switches Q3 and Q4, the third set of switches Q5 and Q6, and the fourth set of switches Q7 and Q8 may be controlled to perform state switching in order to make the voltage conversion ratio of isolated switched capacitor converter 1 adjustable. For example, the voltage conversion ratio can be adjusted by controlling portions of switch sets to remain in a constant state or to perform state switching. Here, the voltage conversion ratio may refer to a ratio of the output voltage to the input voltage.

In particular embodiments, the circuit may operate in the following 3 different modes. In a first mode, there may be isolated buck conversion, switch Q1 can remain turned off, and switch Q2 may remain turned on, making terminal "a" of capacitor C1 connected to terminal "g1" of the input port. Or, switch Q5 may remain turned off, and switch Q6 can remain turned on, making terminal "c" of capacitor C2 connected to terminal "g1" of the input port. Other sets of the switches can perform state switching.

In a second mode, there may be isolated boost conversion, switch Q3 can remain turned off, and switch Q4 may remain turned on, making terminal "b" of capacitor C1 connected to terminal "g2" of the output port. Or, switch Q7 can remain turned off, and switch Q8 may remain turned on, making terminal "d" of capacitor C2 connected to terminal "g2" of the output port. Other sets of the switches perform may state switching.

In a third mode, there may be isolated isobaric conversion, and all the switches can be controlled to perform state switching. The following further describes the three modes of control signals and equivalent circuits with reference to the drawings. The following description illustrates an example case whereby the duty cycle of the control signal is 50%. The time of the isolated switched capacitor converter in the first and second states is thus the same, in order to better reflect the characteristics of the circuit in different modes. However, those skilled in the art will recognize that by adjusting the duty cycle of control signals, operation of the converter can be optimized for a given application.

The two sets of control signals can also have a certain dead time. The dead time may be configured as a protection period in order to prevent the upper and lower switches of the H-bridge or half-H-bridge from being turned on simultaneously due to the switching speed problem during the pulse-width modulation (PWM) output or the PWM response time.

Figure 4:
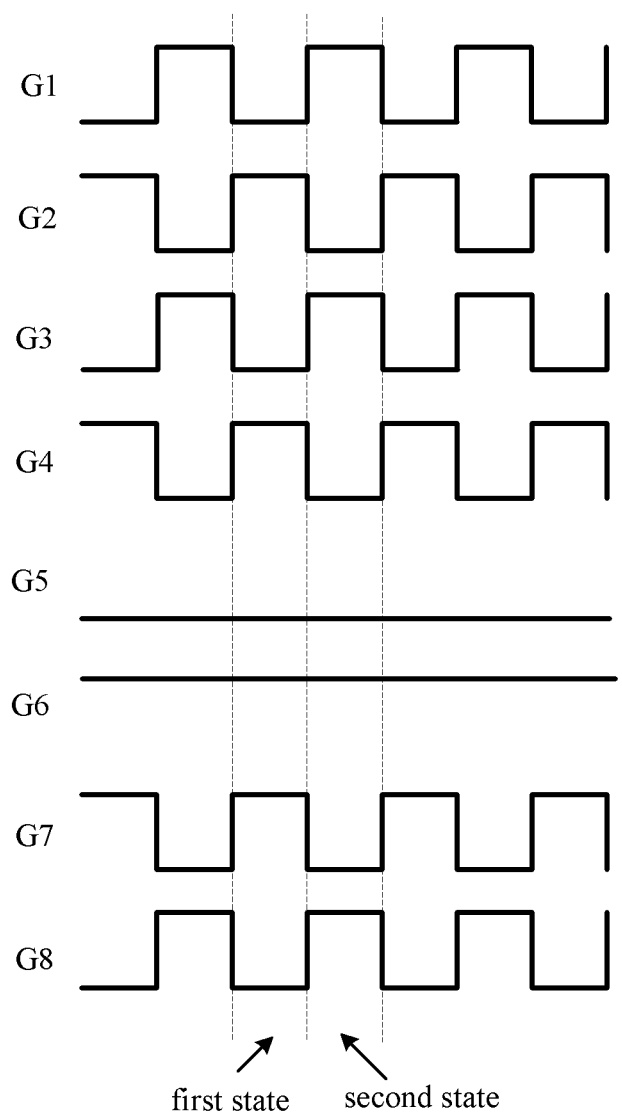
FIG. 4 is a waveform diagram of example operation of the isolated switched capacitor converter in a first mode, in accordance with embodiments of the present invention.
Figure 5:
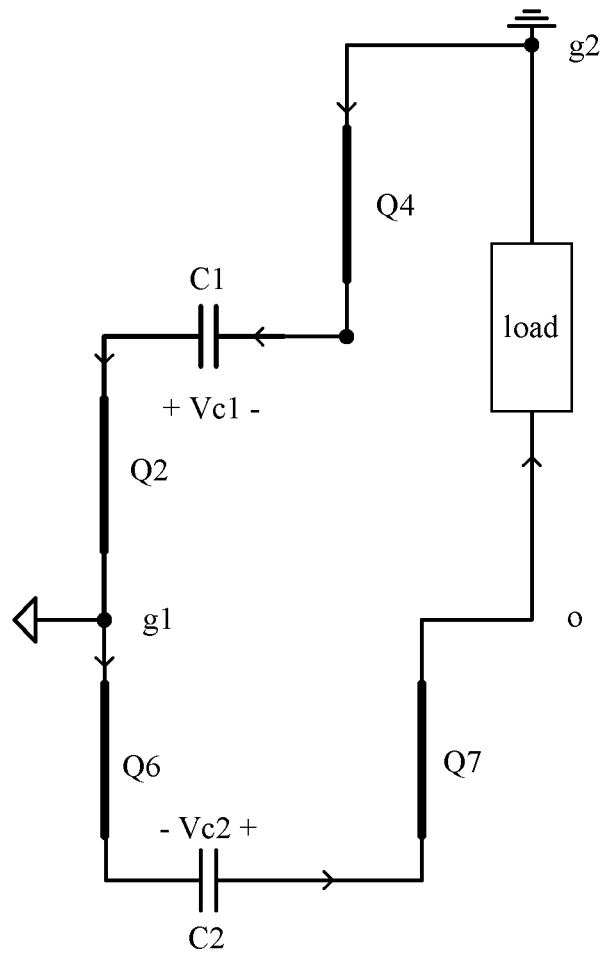
FIG. 5 is an equivalent circuit diagram of the isolated switched capacitor converter in a first state of the first mode, in accordance with embodiments of the present invention.
Figure 6:
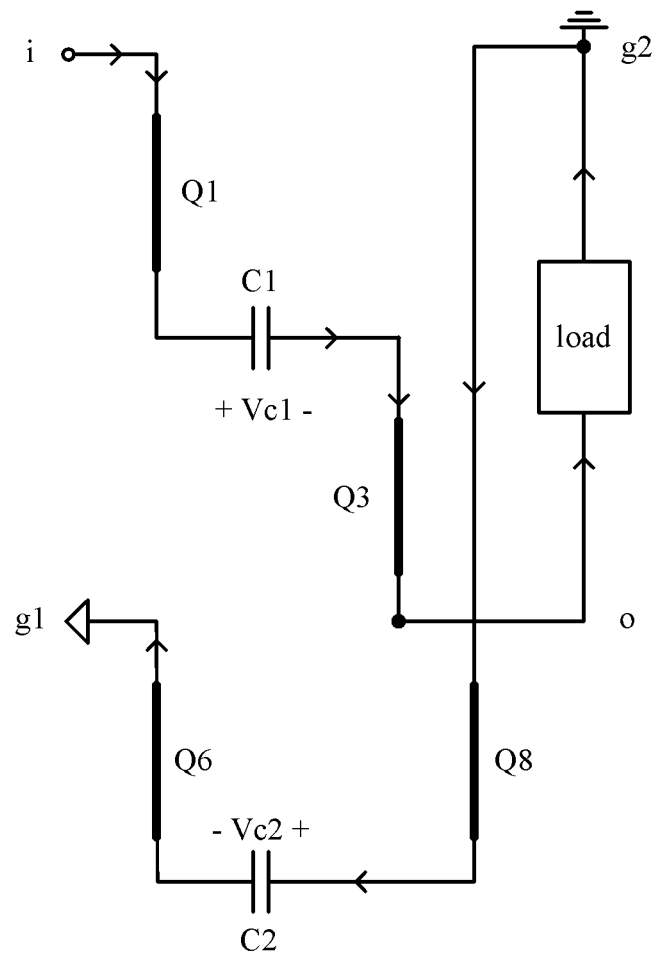
FIG. 6 is an equivalent circuit diagram of the isolated switched capacitor converter in a second state of the first mode, in accordance with embodiments of the present invention.

Referring now to FIG. 4, shown is a waveform diagram of example operation of the isolated switched capacitor converter in a first mode, in accordance with embodiments of the present invention. Referring also to FIG. 5, shown is an equivalent circuit diagram of the isolated switched capacitor converter in a first state of the first mode, in accordance with embodiments of the present invention. Referring also to FIG. 6, shown is an equivalent circuit diagram of the isolated switched capacitor converter in a second state of the first mode, in accordance with embodiments of the present invention.

In the example of FIGS. 4-6, the third set of switches Q5 and Q6 may remain in a constant state. Here, control signals G1 and G2 can control the first set of switches Q1 and Q2. For example, control signals G1 and G2 may respectively control switches Q1 and Q2. Control signals G1 and G2 may be inverted and changed alternately to make switches Q1 and Q2 alternately turn on. In addition, control signals G3 and G4 may be inverted and changed alternately. That is, the first and second sets of switches may perform state switching in the same way.

Thus, control signals G1 and G2 can be seen as a first set of control signals, and since control signals G3 and G4 are the same as control signals G1 and G2 respectively, control signals G3 and G4 can also be seen as the first set of control signals. Control signal G5 may remain low while control signal G6 remains high in order to make switch Q5 remain off and switch Q6 remain on. Control signals G7 and G8 can be inverted and changed alternately to make switches Q7 and Q8 turn on alternately. Control signals G7 and G8 can control the fourth set of switches Q7 and Q8 to perform state switching in the opposite way to the first and second sets of switches. Control signals G7 and G8 may form a second set of control signals which are in opposite phase with the first set of control signals.

In this example, the circuit can operate through multiple cycles before entering the steady state. When output capacitor Co or a capacitive load connected to the output port is charged to a predetermined output voltage, the circuit may enter the steady state. In the first state, switches Q2, Q4, Q6, and Q7 can be turned on, and switches Q1, Q3, Q5, and Q8 may be turned off. At this time, capacitors C1 and C2 may form a loop with the output port and discharge to the output port. The current path corresponding to the equivalent circuit can include capacitor C1, switch Q2, switch Q6, capacitor C2, switch Q7, the output port, and switch Q4. Thus, output voltage Vout may be equal to Vc1+Vc2, where Vc1 is the voltage across capacitor C1, and Vc2 is the voltage across capacitor C2.

In the second state, the first set of switches, the second set of switches, and the fourth set of switches may all perform state switching, where switches Q1, Q3, and Q8 are turned on and switches Q2, Q4, and Q7 are turned off. In addition, the third set of switches may remain in a constant state; that is, switch Q6 is still on and switch Q5 is still off. At this time, terminal "i" of the input port can connect the circuit forming a current path via switch Q1, capacitor C1, switch Q3, the output port, switch Q8, capacitor C2, and switch Q6. The input port may discharge the output port through capacitors C1 and C2. In the second state, output voltage Vout may satisfy: Vout+Vc1+Vc2=Vin. Since the time period of the first and second states is relatively short, and the capacitive load or output capacitor Co may obstruct the change of voltage, voltages Vc1 and Vc2 in the second state may remain unchanged with respect to the first state. Therefore, the following formula (1) may be applied.

$$Vout+Vc1+Vc2=2Vout=Vin \qquad (1)$$

As described above, since output voltage Vout may not change significantly in the two states, output voltage Vout can be maintained around ½ of input voltage Vin, thereby achieving buck isolated conversion. Simultaneously, the input port and the output port can be isolated by capacitors C1 and C2 regardless of the state, such that there may be no need to use a transformer in order to realize isolation. Similarly, since the H-bridge formed by the first set of switches Q1 and Q2, the second set of switches Q3 and Q4, and capacitor C1 is symmetrical to the H-bridge formed by the third set of switches Q5 and Q6, the fourth set of switches Q7 and Q8, and capacitor C2, the first set of switches Q1 and Q2 can be controlled to remain in a constant state by the control signals, and other sets of switches can be controlled to perform state switching periodically at the same time, thereby reaching the same effect.

Figure 7:
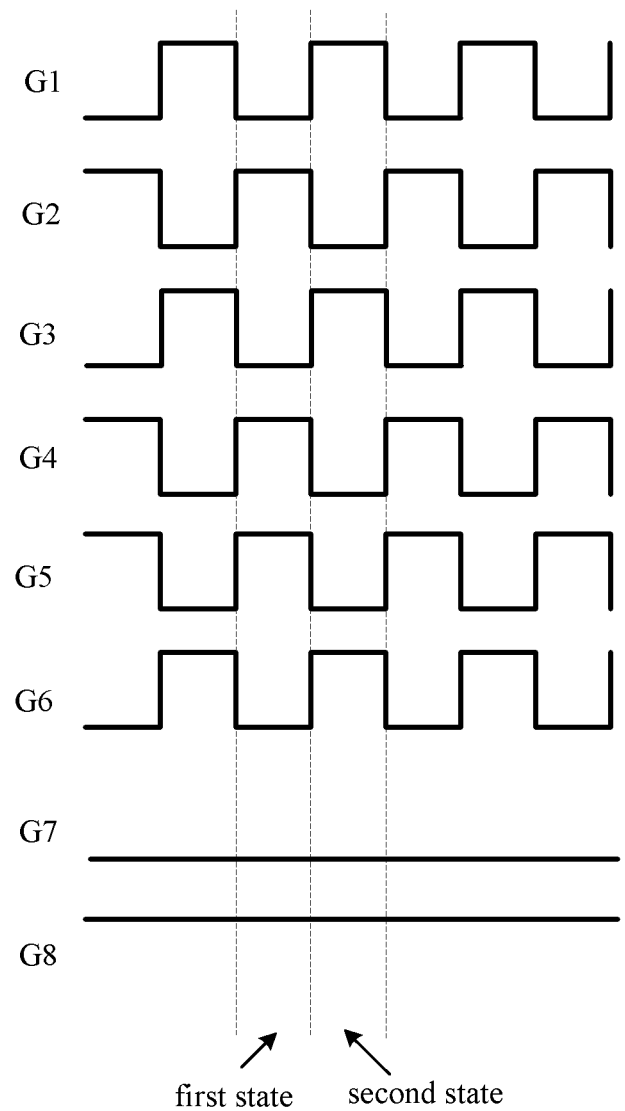
FIG. 7 is a waveform diagram of example operation of the isolated switched capacitor converter in a second mode, in accordance with embodiments of the present invention.
Figure 8:
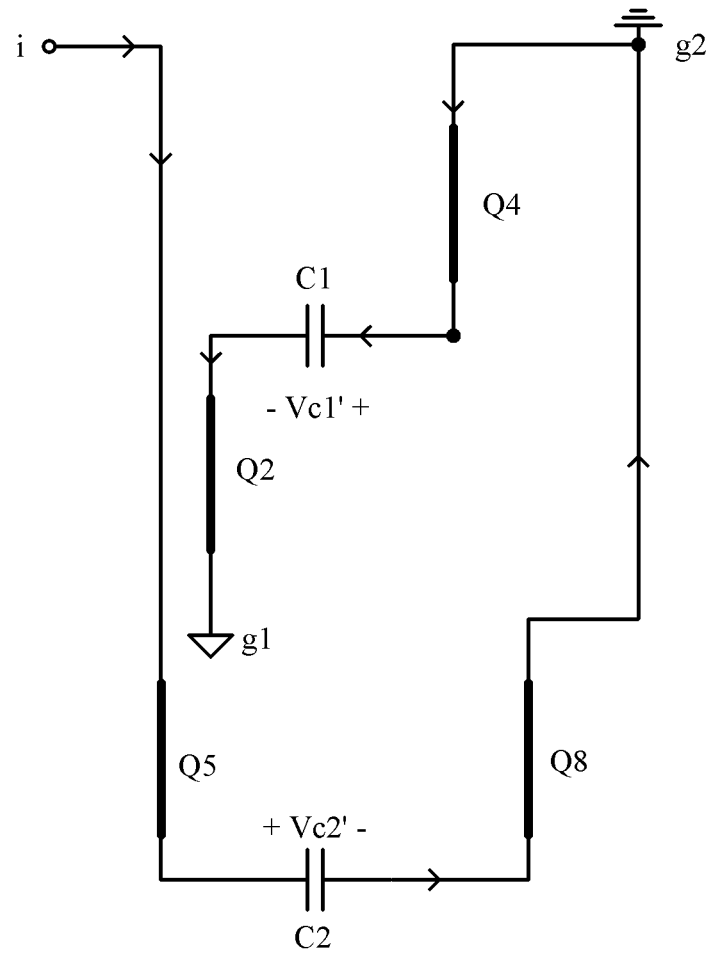
FIG. 8 is an equivalent circuit diagram of the isolated switched capacitor converter in a first state of the second mode, in accordance with embodiments of the present invention.
Figure 9:
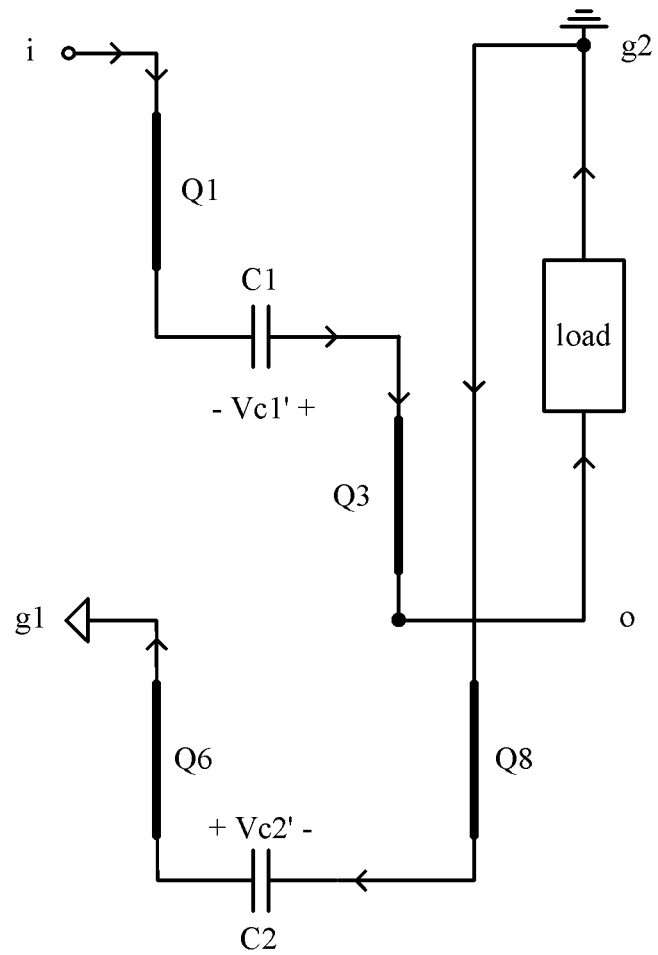
FIG. 9 is an equivalent circuit diagram of the isolated switched capacitor converter in a second state of the second mode, in accordance with embodiments of the present invention.

Referring now to FIG. 7, shown is a waveform diagram of example operation of the isolated switched capacitor converter in a second mode, in accordance with embodiments of the present invention. Referring also to FIG. 8, shown is an equivalent circuit diagram of the isolated switched capacitor converter in a first state of the second mode, in accordance with embodiments of the present invention. Referring also to FIG. 9, shown is an equivalent circuit diagram of the isolated switched capacitor converter in a second state of the second mode, in accordance with embodiments of the present invention.

In the example of FIGS. 7-9, the fourth set of switches Q7 and Q8 may remain in a constant state. Here, control signals G1 and G2 can respectively control switches Q1 and Q2. Control signals G1 and G2 may be inverted and changed alternately to make switches Q1 and Q2 alternately turn on. Moreover, control signals G3 and G4 can be alternately inverted and changed. Control signals G1 and G3 may be in phase, and control signals G2 and G4 may be in phase. That is, the first and second sets of switches can be controlled to perform state switching in the same way under the control of the first set of control signals. Control signal G7 can remain low while control signal G8 remains high to make switch Q7 remain off and switch Q8 remain on, such that that terminal "d" of capacitor C2 can be connected to terminal "g2" of the output port whether in the first or the second state.

Control signals G5 and G6 may be inverted and changed to make switches Q5 and Q6 turn on alternately. In addition, control signals G5 and G2 may be in phase, and control signals G6 and G1 may be in phase. That is, the third set of control signals G5 and G6 can control the third set of switches Q5 and Q6 to perform state switching in the opposite way to the first and second sets of switches. The first and second sets of control signals may be inverted. In this example, the circuit can operate through multiple cycles before entering the steady state, and when output capacitor Co or the capacitive load connected to the output port is charged to a predetermined output voltage, the circuit may enter the steady state.

In the first state, switches Q2, Q4, Q5 and Q8 can be turned on, and switches Q1, Q3, Q6 and Q7 turned off.

Isolated switched capacitor converter 1 may form a current loop from terminal "i" of the input port via switch Q5, capacitor C2, switch Q8, terminal "g2" of the output port, switch Q4, capacitor C1, and switch Q2 to terminal "g1" of the input port. Thus, input voltage Vin may be equal to Vc1'+Vc2', where Vc1' is the voltage across capacitor C1, and Vc2' is the voltage across capacitor C2. In the second mode, voltage Vc1' across capacitor C1 and voltage Vc2' across capacitor C2 can be inverted relative to voltage sVc1 and Vc2 in FIGS. 5 and 6. In the first state, the output port may not be connected to the circuit such that output voltage Vout can be maintained according to the capacitance of the capacitive load itself or output capacitor Co of the output port.

In the second state, the first, second, and third sets of switches may all perform state switching, where switches Q1, Q3, and Q6 are turned on and switches Q2, Q4, and Q5 are turned off. In addition, the fourth set of switches may remain in a constant state; that is, switch Q8 is still on and switch Q7 is still off. At this time, terminal "o" of the output port can connect the circuit forming a current path via switch Q1, capacitor C1, switch Q3, the output port, switch Q8, capacitor C2, and switch Q6 to terminal "g1" of the input port. The input port can discharge the output port through capacitors C1 and C2. In the second state, output voltage Vout may satisfy: Vout=Vin+Vc1'+Vc2'. Since the time period of the first and second states is relatively short, and the capacitive load or output capacitor Co may obstruct the change of voltage, voltages Vc1' and Vc2' in the second state may be unchanged with respect to the first state. Therefore, the following formula (2) may be applied.

$$Vin+Vc1'+Vc2'=2Vin=Vout \quad (2)$$

As described above, since output voltage Vout may not change significantly in the two states, output voltage Vout can be maintained at 2 times input voltage Vin, thereby achieving boost isolated conversion. In addition, the input port and the output port can be isolated by capacitors C1 and C2 regardless of the state, such that there may be no need to utilize a transformer in order to realize isolation. Since the H-bridge formed by the first set of switches Q1 and Q2, the second set of switches Q3 and Q4, and capacitor C1 is symmetrical to the H-bridge formed by the third set of switches Q5 and Q6, the fourth set of switches Q7 and Q8, and capacitor C2, the second set of switches Q3 and Q4 can be controlled to remain in a constant state through control signals, and other sets of switches can be controlled to perform state switching periodically at the same time, thereby reaching the same effect.

Figure 10:
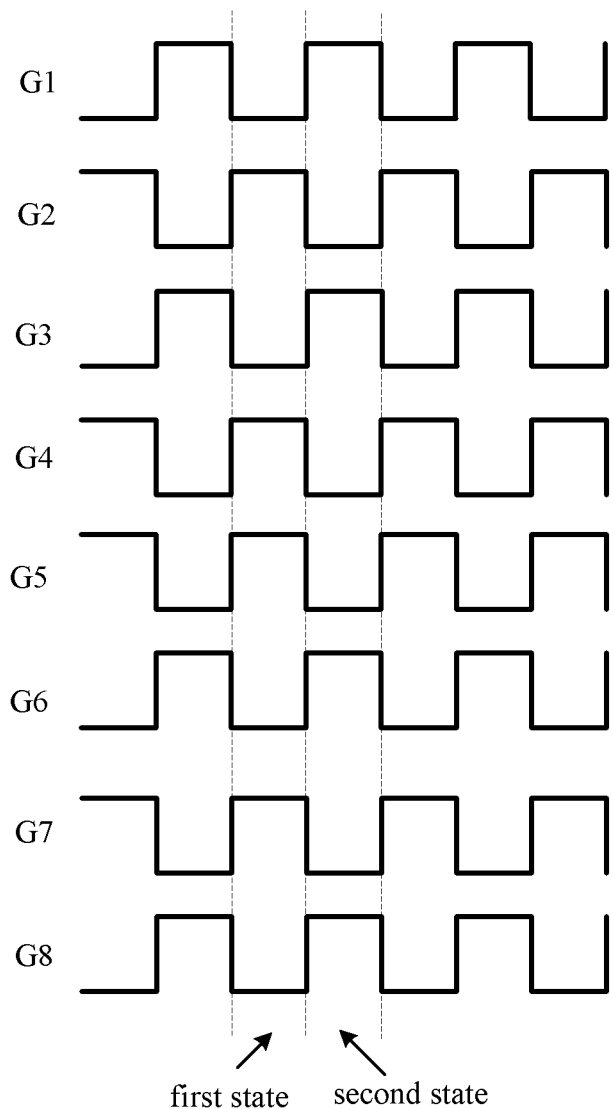
FIG. 10 is a waveform diagram of example operation of the isolated switched capacitor converter in a third mode, in accordance with embodiments of the present invention.
Figure 11:
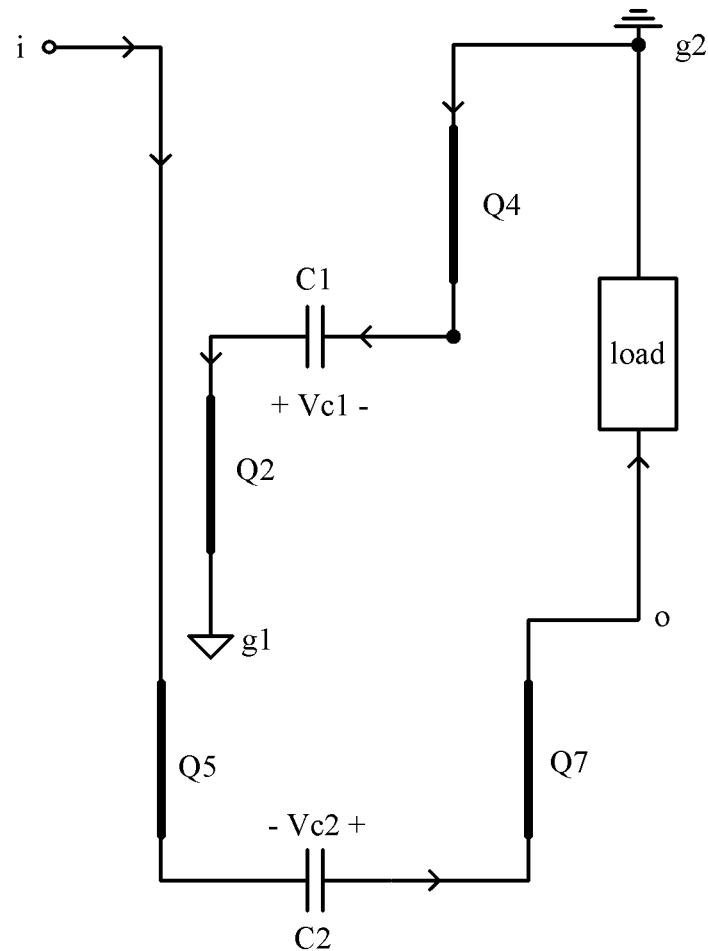
FIG. 11 is an equivalent circuit diagram of the isolated switched capacitor converter in a first state of the third mode, in accordance with embodiments of the present invention.
Figure 12:
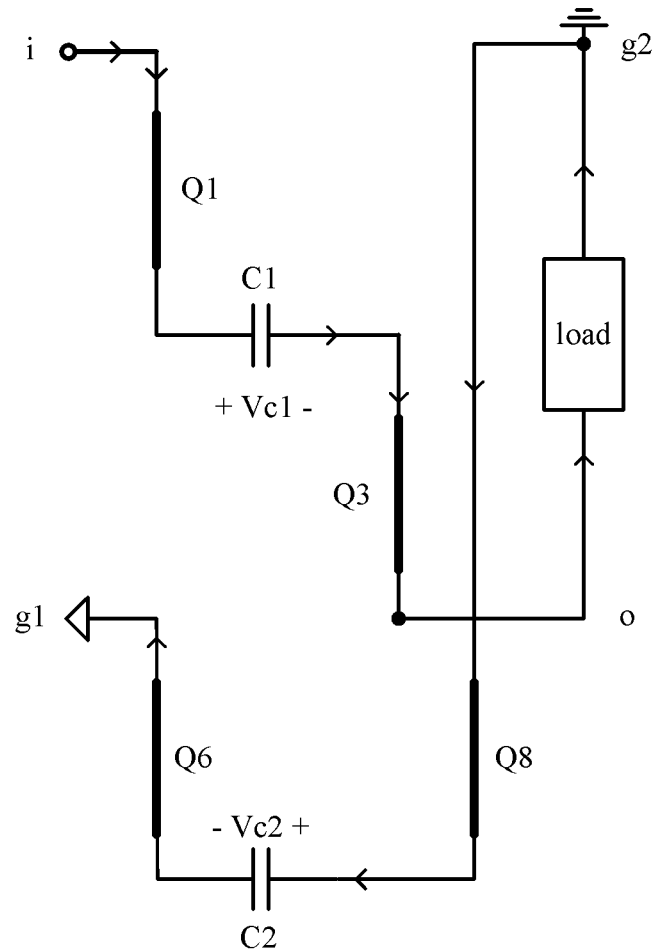
FIG. 12 is an equivalent circuit diagram of the isolated switched capacitor converter in a second state of the third mode, in accordance with embodiments of the present invention.

Referring now to FIG. 10 is a waveform diagram of example operation of the isolated switched capacitor converter in a third mode, in accordance with embodiments of the present invention. Referring also to FIG. 11, shown is an equivalent circuit diagram of the isolated switched capacitor converter in a first state of the third mode, in accordance with embodiments of the present invention. Referring also to FIG. 12, shown is an equivalent circuit diagram of the isolated switched capacitor converter in a second state of the third mode, in accordance with embodiments of the present invention.

In the third mode, all switches perform state switching periodically to make the output voltage the same as the input voltage. Control signals G1-G4 can respectively control switches Q1-Q4. Control signals G1 and G2 may be inverted and changed alternately to make switches Q1 and Q2 turn on alternately. Simultaneously, control signals G3 and G4 can be inverted and changed alternately. Control signals G1 and G3 may be in phase, and control signals G2 and G4 can be in phase. That is, the first and second sets of switches may perform state switching in the same way.

Correspondingly, control signals G5-G8 can respectively control switches Q5-Q8. Control signals G5 and G6 may be inverted and changed alternately to make switches Q5 and Q6 turn on alternately. Simultaneously, control signals G7 and G8 can be inverted and changed alternately. Control signals G5 and G7 may be in phase, and control signals G6 and G8 are in phase. Control signals G5 and G7, and control signals G1 and G3 may be inverted. That is, the third and fourth sets of switches may perform state switching in the same way, which is opposite to that of the first and second sets of switches.

Thus, in the first state, switches Q2, Q4, Q5 and Q7 can be turned on, and switches Q1, Q3, Q6 and Q8 may be turned off. Therefore, a current path can be formed from terminal "i" of the input port via switch Q5, capacitor C2, switch Q7, the output port, switch Q4, capacitor C1, and switch Q2, to terminal "g1" of the input port. The input port can charge the output port through capacitors C1 and C2, and output voltage Vout may satisfy: Vout−Vc1−Vc2=Vin.

In the second state, switches Q1, Q3, Q6, and Q8 can be turned on, and switches Q2, Q4, Q5, and Q7 may be turned off. Thus, a current path may be formed from terminal "i" of the input port via switch Q1, capacitor C1, switch Q3, the output port, switch Q8, capacitor C2, and switch Q6, to terminal "g1" of the input port. It can be seen that the currents flowing through capacitors C1 and C2 in the first and second states may be inverted. The input port can charge the output port through capacitors C1 and C2, and the output voltage may satisfy: Vout+Vc1+Vc2=Vin. In both states, the currents flowing through capacitors C1 and C2 can be counterbalanced by each other, such that that Vc1+Vc2=0, and Vout=Vin. That is, the output voltage is equal to the input voltage in this case, reaching isobaric conversion. Further, the input port and the output port can be isolated by capacitors C1 and C2 regardless of the state, such that there may be no need to utilize inductors in order to realize isolation.

Two parallel H-bridge switched capacitor networks may be respectively built by the first and second sets of switches and capacitor C1, and the third and fourth sets of switches and capacitor C2, in order to effectively isolate the input port and the output port. In addition, power conversion can be realized by controlling each set of switches to remain in a constant state or to perform state switching, and then controlling capacitors C1 and C2 to charge and discharge. The voltage conversion ratio can be adjusted by applying different control methods. Therefore, the input port and the output port can be isolated without the transformer, which can reduce the volume of the isolated converter and further realize buck and boost operation. The isolated switched capacitor converter in particular embodiments has a simple structure and improved flexibility, as compared to other approaches, and the voltage conversion ratio can be adjusted while the input and output ports are isolated.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An isolated switched capacitor converter, comprising:
   a) a first capacitor;

b) a first set of switches coupled in series between first and second terminals of an input port, and being configured to selectively connect a first terminal of the first capacitor to the first terminal or the second terminal of the input port;

c) a second set of switches coupled in series between first and second terminals of an output port, and being configured to selectively connect a second terminal of the first capacitor to the first terminal or the second terminal of the output port;

d) a second capacitor;

e) a third set of switches coupled in series between the first and second terminals of the input port, and being configured to selectively connect a first terminal of the second capacitor to the first terminal or the second terminal of the input port; and f) a fourth set of switches coupled in series between the first and second terminals of the output port, and being configured to selectively connect a second terminal of the second capacitor to the first terminal or the second terminal of the output port, wherein at least portions of the first, second, third, and fourth sets of switches are controlled to perform state switching such that a voltage conversion ratio of the isolated switched capacitor converter is adjustable, g) wherein one of the first and second terminals of the input port is coupled to a first ground potential without any switches therebetween, and one of the first and second terminals of the output port is coupled to a second ground potential without any switches therebetween, wherein the second ground potential is different than the first ground potential, wherein each current path has one current direction formed by switching states of the switches and passes through the first and second ground potentials, the first and second capacitors, and at least one switch in each set of switches, wherein the first and second ground potentials are isolated by at least one of the first and second capacitors in each current path.

2. The isolated switched capacitor converter of claim 1, wherein one of the first, second, third, and fourth sets of switches remains in a constant state to make an output voltage different from an input voltage of the isolated switched capacitor converter.

3. The isolated switched capacitor converter of claim 2, wherein the first set of switches or the third set of switches remains in a constant state to make the output voltage less than the input voltage.

4. The isolated switched capacitor converter of claim 3, wherein the remaining switches are controlled to perform state switching to make the output voltage constant.

5. The isolated switched capacitor converter according to claim 3, wherein:

a) the first set of switches keeps the first terminal of the first capacitor connected to the second terminal of the input port;

b) the second set of switches performs state switching according to a first set of control signals; and c) the third and fourth sets of switches perform state switching according to a second set of control signals, and the first and second sets of control signals are inverted.

6. The isolated switched capacitor converter according to claim 3, wherein:

a) the third set of switches keeps the first terminal of the second capacitor connected to the second terminal of the input port;

b) the first and second sets of switches perform state switching according to a first set of control signals; and c) the fourth set of switches performs state switching according to a second set of control signals, and the first and second sets of control signals are inverted.

7. The isolated switched capacitor converter of claim 2, wherein the second set of switches or the fourth set of switches remains in a constant state to make the output voltage greater than the input voltage.

8. The isolated switched capacitor converter of claim 7, wherein the remaining switches are controlled to perform state switching to make the output voltage constant.

9. The isolated switched capacitor converter of claim 7, wherein:

a) the second set of switches keeps the second terminal of the first capacitor connected to the second terminal of the output port;

b) the first set of switches performs state switching according to a first set of control signals; and c) the third and fourth sets of switches perform state switching according to a second set of control signals, and the first and second sets of control signals are inverted.

10. The isolated switched capacitor converter of claim 7, wherein:

a) the fourth set of switches keeps the second terminal of the second capacitor connected to the second terminal of the output port;

b) the first and second sets of switches perform state switching according to a first set of control signals; and c) the third set of switches performs state switching according to a second set of control signals, and the first and second sets of control signals are inverted.

11. The isolated switched capacitor converter of claim 2, wherein the first, second, third, and fourth sets of switches perform state switching to make the output voltage equal to the input voltage.

12. The isolated switched capacitor converter of claim 11, wherein:

a) the first set of switches and the second set of switches perform state switching according to a first set of control signals; and b) the third set of switches and the fourth set of switches perform state switching according to a second set of control signals, and the first and second sets of control signals are inverted.

13. The isolated switched capacitor converter of claim 1, wherein:

a) the first set of switches are controlled by a corresponding first set of control signals; and b) the second set of switches are controlled by a corresponding second set of control signals.

14. The isolated switched capacitor converter of claim 13, wherein the first and second sets of control signals are complementary and with dead zones between transitions thereof.

15. The isolated switched capacitor converter of claim 1, wherein the first set of switches comprises:

a) a first switch coupled between the first terminal of the input port and the first terminal of the first capacitor; and b) a second switch coupled between the second terminal of the input port and the first terminal of the first capacitor.

16. The isolated switched capacitor converter of claim 15, wherein the second set of switches comprises:

a) a third switch coupled between the first terminal of the output port and the second terminal of the first capacitor; and b) a fourth switch coupled between the second terminal of the output port and the second terminal of the first capacitor.

17. The isolated switched capacitor converter of claim 16, wherein the third set of switches comprises:

a) a fifth switch coupled between the first terminal of the input port and the first terminal of the second capacitor; and b) a sixth switch coupled between the second terminal of the input port and the first terminal of the second capacitor.

18. The isolated switched capacitor converter of claim 17, wherein the fourth set of switches comprises:

a) a seventh switch coupled between the first terminal of the output port and the second terminal of the second capacitor; and b) an eighth switch coupled between the second terminal of the output port and the second terminal of the second capacitor.

19. The isolated switched capacitor converter of claim 1, wherein control signals for the first and second sets of switches have a same duty cycle when performing the state switching.

20. The isolated switched capacitor converter of claim 19, wherein the same duty cycle is about 50% with dead zones between transitions of the control signals.

* * * * *